(12) United States Patent
O'Mahony et al.

(10) Patent No.: US 11,366,606 B2
(45) Date of Patent: Jun. 21, 2022

(54) SMARTER PERFORMANCE ALERTING MECHANISM COMBINING THRESHOLDS AND HISTORICAL SEASONALITY

(71) Applicant: EMC IP HOLDING COMPANY LLC, Hopkinton, MA (US)

(72) Inventors: Lisa O'Mahony, Glanmire (IE); David Moloney, Carrigaline (IE); Eileen Kelleher, Wilton (IE); Francisco Jaen, Cork (IE)

(73) Assignee: Dell Products, L.P., Hopkinton, MA (US)

( * ) Notice: Subject to any disclaimer, the term of this patent is extended or adjusted under 35 U.S.C. 154(b) by 40 days.

(21) Appl. No.: 17/060,190

(22) Filed: Oct. 1, 2020

(65) Prior Publication Data

US 2022/0107748 A1  Apr. 7, 2022

(51) Int. Cl.
*G06F 3/06* (2006.01)
(52) U.S. Cl.
CPC .......... *G06F 3/0653* (2013.01); *G06F 3/0605* (2013.01); *G06F 3/0683* (2013.01)
(58) Field of Classification Search
CPC ..... G06F 3/0653; G06F 3/0683; G06F 3/0605
See application file for complete search history.

(56) References Cited

U.S. PATENT DOCUMENTS

| | | | | |
|---|---|---|---|---|
| 9,454,321 | B1* | 9/2016 | Smaldone | G06F 3/061 |
| 2016/0330086 | A1* | 11/2016 | Oda | H04L 12/6418 |
| 2016/0371181 | A1* | 12/2016 | Garvey | G06F 12/0253 |
| 2018/0293009 | A1* | 10/2018 | Sharon | G11C 16/3431 |

* cited by examiner

*Primary Examiner* — Chie Yew
(74) *Attorney, Agent, or Firm* — Anderson Gorecki LLP (57) ABSTRACT

A storage system management application receives reports describing operation of a storage system from a performance monitoring system, and compares the storage system operating metrics against a set of respective thresholds. If the metrics breach one or more thresholds, the seasonality boundaries for the respective metric are calculated, and an alert is only generated if the storage system operating metric is both outside the performance threshold and outside of the calculated seasonality boundaries. By determining the seasonality boundaries and using the seasonality boundaries to determine when to generate alerts, it is possible to reduce the number of alerts generated. By including the seasonality values in the alerts, the deviation from normal seasonably operating conditions can be determined from the alert, thus enabling a person who receives the alert to determine the magnitude of deviation of the storage system operation from seasonably adjusted normal operation.

20 Claims, 5 Drawing Sheets

SMARTER PERFORMANCE ALERTING MECHANISM COMBINING THRESHOLDS AND HISTORICAL SEASONALITY

FIELD

This disclosure relates to computing systems and related devices and methods, and, more particularly, to a smarter performance alerting mechanism combining thresholds and historical seasonality.

BACKGROUND

Storage systems are complex systems, involving numerous components, which are used to store mission critical data. Monitoring systems have been developed for the storage systems which enable a system administrator to determine whether the storage system is operating as expected. One aspect of some monitoring systems enables the system administrator or another entity to set thresholds for various metrics, such that if one or more of the components starts to operate unexpectedly, an alert may be generated and sent to a system administrator. For example, a complex storage system may have 60 or more metric categories, and within each category there may be 20 or more individual metrics that may be monitored.

Thus, the monitoring system may have more than a thousand thresholds that need to be set and, any time a threshold is breached, an alarm will be generated. However, not all alerts are truly indicative of a serious issue and, therefore, unfortunately, current alert systems can generate considerable noise and false alerts, potentially flooding the system administrator and causing genuine alerts to be overlooked. Accordingly, it would be advantageous to provide a way to generate fewer and more accurate alerts related to storage system operational metrics.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a smarter performance alerting mechanism combining thresholds and historical seasonality is provided. A storage system management application receives reports describing operation of a storage system from a performance monitoring system, and compares the storage system operating metrics against a set of respective thresholds. If one or more of the operational metrics breeches one or more thresholds, an intelligent comparison engine calculates the seasonality boundaries for the respective metric, and an alert is only generated if the storage system operating metric is both outside the performance threshold and outside of the calculated seasonality boundaries. As used herein, the term "outside" and "breached" are used to refer to a condition where the measured storage system operating metric is either above or below the respective threshold and/or calculated seasonality boundaries for the monitoring interval, depending on the metric. By determining the seasonality boundaries and using the seasonality boundaries to determine when to generate alerts, it is possible to reduce the number of alerts generated and generate more accurate alerts related to storage system performance.

DETAILED DESCRIPTION

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, and/or computer instructions that are stored on a non-transitory tangible computer-readable medium and implemented by multi-purpose tangible processors, and any combinations thereof.

Figure 1:
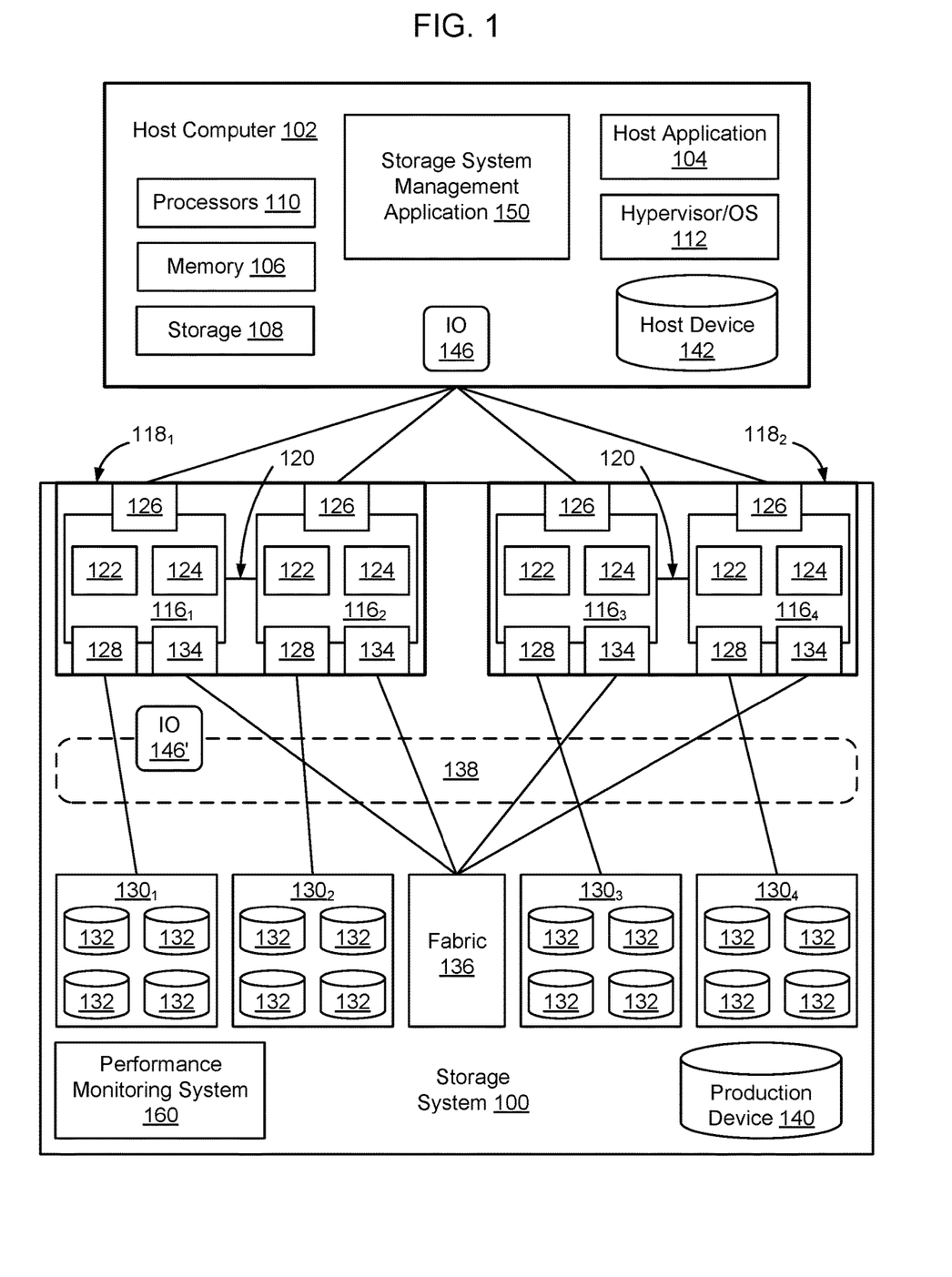
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. One example of a host application 104 is a storage system management application 150, which is discussed in greater detail below.

In the illustrated example the host computer 102 is a server with volatile memory 106, persistent storage 108, one or more tangible processors 110, and a hypervisor or OS (Operating System) 112. The processors 110 may include one or more multi-core processors that include multiple CPUs (Central Processing Units), GPUs (Graphical Processing Units), and combinations thereof. The volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM, and in some embodiments is used to implement a cache for processors 122. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$ using a PCIe (Peripheral Component Interconnect express) bus, or may be connected to the compute nodes $116_1$-$116_4$, for example, by an IB (InfiniBand) bus or IB fabric switch 136.

In some embodiments, each compute node 116 also includes one or more CAs (Channel Adapters) 134 for communicating with other compute nodes 116 directly or via an interconnecting fabric 136. An example interconnecting fabric may be implemented using InfiniBand.

Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access) such that each compute node 116 may implement atomic operations on the local volatile memory 124 of itself and on the local volatile memory 124 of each other compute node 116 in the storage system 100.

The storage system 100 maintains data for the host applications 104 running on the host computer 102. For example, host application 104 may write host application data to the storage system 100 and read host application data from the storage system 100 in order to perform various functions. Examples of host applications 104 may include, but are not limited to, file servers, email servers, block servers, databases, and storage system management application 150.

Logical storage devices are created and presented to the host application 104 for storage of the host application data. For example, as shown in FIG. 1, in some embodiments a production device 140 and a corresponding host device 142 are created to enable the storage system 100 to provide storage services to the host application 104. The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by one or more of the compute nodes $116_1$-$116_4$ at non-contiguous addresses in shared global memory 138 and on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (Input/Output) command 146 from the host application 104 to the host device 142, the hypervisor/OS 112 determines whether the IO 146 can be serviced by accessing the host computer memory 106. If that is not possible then the IO 146 is sent to one of the compute nodes $116_1$-$116_4$ to be serviced by the storage system 100.

In the case where IO 146 is a read command, the storage system 100 uses metadata to locate the commanded data, e.g. in the shared global memory 138 or on managed drives 132. If the commanded data is not in the shared global memory 138, then the data is temporarily copied into the shared global memory 138 from the managed drives 132 and sent to the host application 104 via one of the compute nodes $116_1$-$116_4$. In the case where the IO 146 is a write command, in some embodiments the storage system 100 copies a block being written into the shared global memory 138, marks the data as dirty, and creates new metadata that maps the address of the data on the production device 140 to a location to which the block is written on the managed drives 132. The shared global memory 138 may enable the production device 140 to be reachable via all of the compute nodes $116_1$-$116_4$ and paths, although the storage system 100 can be configured to limit use of certain paths to certain production devices 140.

In some embodiments, the storage system 100 presents storage volumes as TLUs (Thin Logical Units). A TLU is a logical construct which enables the physical drives 132 of the storage system 100 to be abstracted from the host applications 104. A logical unit is "thin", as that term is used herein, when actual physical capacity of drives 132 is only allocated to the TLU as needed. For example, a TLU may be presented to the host application 104 as having an available size of 1 TB (terabyte). However, if the filesystem stored in the TLU is only 0.5 TB in size, the storage system 100 will only allocate 0.5 TB of physical storage resources on drives 132 to the TLU. Thus, the amount of physical storage resources allocated to a TLU will increase and decrease over time as the amount of data stored on the TLU changes over time. Within the physical storage resources, Data Devices (TDATs) are used to store the data, in which a given TDAT may be formed of a redundant group of physical disk drives, i.e. a TDAT may be formed from a RAID group of disk drives 132 that store blocks of data within the storage array 130.

Different storage resources may have different 10 characteristics. Storage resource 132 with similar 10 characteristics are grouped together to form storage pools. Storage groups 216 (see FIG. 2) are created within the storage pools. TLUs are allocated physical storage resources from a selected storage pool based on intended service level objectives for the data contained in the filesystem maintained by the TLU. Example service level objectives might include, throughput, bandwidth and or response time metrics. Different production devices 140 may have different service level objectives and, accordingly, different production devices 140 may be located in different storage groups 216.

As shown in FIG. 1, in some embodiments one of the applications executing on the host computer 102 is a storage system management application 150. The storage system management application 150 enables a customer to set QOS (Quality Of Service) metrics on the storage system 100. Depending on the implementation, the QOS metrics 155 may include multiple parameters of storage system 100 operation. Example QOS metrics 155 may include, for example throughput, bandwidth, and response time, although other metrics similarly may be used, depending on the implementation. Throughput specifies the number of IOPS (IO operations per second) that the storage system 100 should provide. Bandwidth (MB/second) specifies the amount of front-end or back-end resources that should be allocated, such as on the front-end adapter 126, back-end adapter 128 and/or fabric 136. Response time (ms) specifies the amount of time the storage system 100 should take to respond to an IO operation. Numerous QOS metrics may thus be specified, and different QOS metrics may be set for different storage groups 216 or host devices 142.

In some embodiments, as described in greater detail below, a performance monitoring system 160 executing on the storage system collects information about operational metrics of how the storage system is currently performing, and reports the operational metrics back to the storage system management application 150.

The performance monitoring system may monitor multiple performance categories covering both physical aspects of the storage system (e.g. arrays, directors, ports, discs, etc.) and logical aspects of the storage system (e.g. storage groups, masking views, etc.). Combined, the performance monitoring system may monitor thousands of individual performance metrics. Some common performance metrics that might be applicable across multiple categories would be, for example, the response times (total/read/write), throughput (total/read/write), IOs per second (total/read/write), utilization (% busy), and remaining capacity. Likewise individual categories would have specific metrics that would only be applicable to that category. Each of these categories/metrics can have global or individual thresholds applied. The proposed solution is generic and can equally be applied across any category/metric combination.

The storage system management application 150 receives reports describing operation of the storage system 100 from the performance monitoring system 160, and compares the storage system operating metrics against a set of respective thresholds. If the metrics breech one or more thresholds, the seasonality boundaries for the respective metric are calculated, and an alert is only generated if the storage system operating metric is both outside the performance threshold and outside of the calculated seasonality boundaries. By determining the seasonality boundaries and using the seasonality boundaries to determine when to generate alerts, it is possible to reduce the number of alerts generated by the storage system management application 150. This also enables the storage system management application 150 to generate more accurate alerts related to storage system performance, by only generating alerts when the storage system is operating in a seasonably adjusted unusual manner.

In some complex storage systems, the performance metrics monitored by the performance monitoring system 160 includes metrics related to both physical resources of the storage system and logical storage components. The performance metrics may be divided into categories, with each category having multiple individual performance metrics. Some individual performance metrics, such as response time (total/read/write), throughput (Total/read/write), IOs Per Second (IOPS) (Total/read/write), Utilization (% busy), and Capacities, are applicable across multiple categories. Individual categories may also have specific individual performance metrics that are only applicable to those specific categories. In some embodiments, more than a thousand individual storage system operational metrics may be monitored by the performance monitoring system 160, and reported back to the storage system management application 150. The storage system management application 150 has individual performance thresholds set for each metric, and is configured to intelligently generate alerts when one or more of the metrics is breached.

Figure 2:
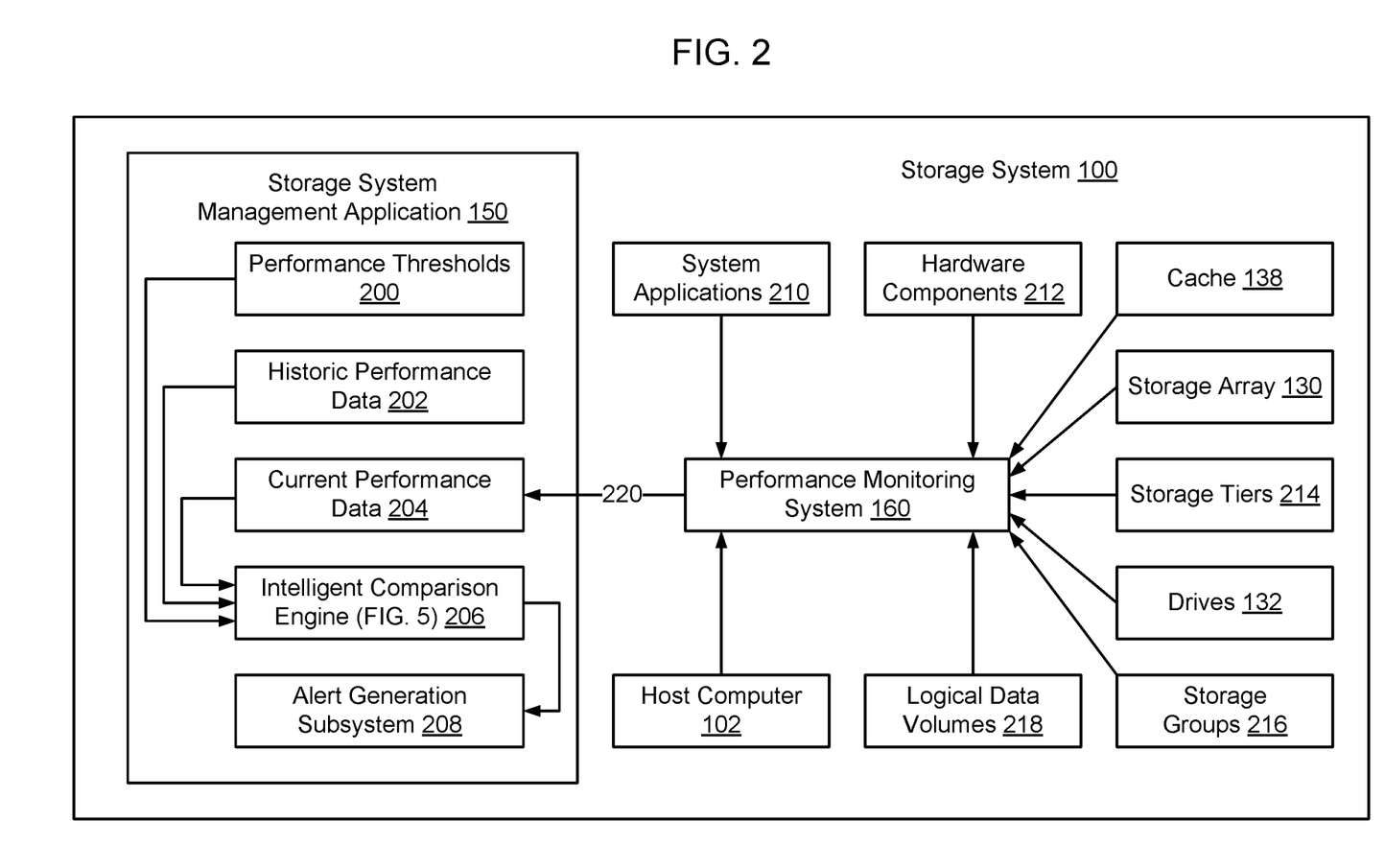
FIG. 2 is a functional block diagram of an example storage system showing aspects of a performance monitoring system and storage system management application, according to some embodiments.

FIG. 2 is a functional block diagram of an example storage system showing aspects of a performance monitoring system 160 and storage system management application 150, according to some embodiments. As shown in FIG. 2, in some embodiments the performance monitoring system monitors system applications 210. Example system applications might include an application configured to create point in time copies of data (snapshots), or a remote data forwarding application configured to mirror data to a backup storage system. Other system applications may be monitored as well, and these are only two example system applications.

In some embodiments, the performance monitoring system 160 collects information related to usage of various hardware components 212 of the storage system 100. Example hardware components were discussed above in connection with FIG. 1, and include, for example, front end adapters 126, back end adapters 128, processors 122, fabric 136, and other physical components.

In some embodiments, the performance monitoring system collects information related to usage of storage resources of the storage system, including cache 138, storage arrays 130, storage tiers 214 (in a tiered storage system), and individual drives 130. The performance monitoring system, in some embodiments, also collects information related to logical aspects of the storage resources, including usage information relating to storage groups 216 and other logical data volumes 218. The performance monitoring system can also monitor operations of the host computer 102.

The performance monitoring system 160 consolidates the storage system operational metrics and periodically reports the storage system operational metrics (arrow 220) to the storage system management application 150 as current performance data 204.

The storage system management application 150 includes a set of performance thresholds 200. In some embodiments, an individual performance threshold is set for each storage system operational metric. Optionally, the performance thresholds may be user-adjustable thresholds. In some embodiments, the thresholds are related to user specified quality of service, such that breach of a threshold may indicate that the storage system is operating in such a manner that it is likely to fail to meet one or more of the quality of service parameters.

The storage system management application 150, in some embodiments, includes an intelligent comparison engine 206 configured to compare each operational metric in current performance data 204 with the corresponding performance thresholds 200. If the current operational metric breaches the respective corresponding performance threshold 200, e.g. the current operational metric is above or below the threshold depending on the metric, the intelligent comparison engine obtains historic performance data 202 for the operational metric, and determines seasonality boundaries for the respective operational metric. The seasonality boundaries provide information about normal operational characteristics of the storage system 100 for the respective operational metric, to determine whether breaching the threshold is normal for this time of the day, the day of the week, or the day of the month. Only if the current performance data has breached the respective threshold, and is also outside the seasonality boundaries, is an alert generated by an alert generation subsystem 208.

By analyzing a threshold breach event of an operational metric within the context of calculated seasonality boundaries, it is possible to identify whether the threshold breach is normal or an anomaly. By restricting alerts to only being generated for threshold breaches that are anomalies, it is possible to greatly reduce the number of alerts generated by the storage system management application, while also increasing the accuracy of the alerts that are generated by the alert generation subsystem 208.

In some embodiments, when an operational metric is determined to have breached a respective threshold, historic performance data 202 for the operational metric is obtained by the intelligent comparison engine 206. For example, historic performance data for a preceding two to three-week period may be obtained from the historic performance data 202. A longer historic performance period may be considered, depending on the implementation. The timeseries data for the operational metric is then decomposed using an algorithm such as Seasonal and Trend decomposition using Loess (STL), which isolates the seasonal, trend, and random components of the time series. The trend component of the timeseries reflects the long-term progression of the series. A trend exists when there is a persistent increasing or decreasing direction of the data. The cyclical component reflects repeated but non-periodic fluctuations of the timeseries. The seasonal component at Time t, reflects the periodic seasonality (seasonal variation). A seasonal pattern exists when a time series is influenced by seasonal factors. Seasonality occurs over a fixed and known period, such as the hour of the day, the day of the week, etc.

The intelligent comparison engine 206 uses the historical data 202 to calculate seasonality upper and lower bounds for the specific time interval that the threshold breach occurred. In some embodiments, the specific time interval that the threshold breach occurred is the monitoring period during which the performance management system 160 collected the storage system operational metric data that was reported to the storage system management system 150. Using the calculated seasonality upper and lower bounds, the intelligent comparison engine 206 determines if the threshold breach is normal for the storage system during the time interval, or is a genuine anomaly. Only where the threshold breach is determined to be outside of the calculated seasonality boundaries is an alert generated. By calculating the seasonality boundaries, and only generating an alert if the threshold breach is also outside of the seasonality boundaries, the number of alerts generated by the storage system management application 150 is reduced, which is beneficial to a system administrator who may receive hundreds of such alerts each day.

Further, calculating the seasonality boundaries allows the storage system management application to generate smarter alerts. For example, rather than having the alert simply include the raw value of the operational metric, in some embodiments the alert also includes the calculated seasonality boundaries in addition to the raw value of the operational metric. This enables the system administrator to identify, from the alert, the normal operational metrics of the storage system during the interval. This makes it easier for the person who receives the alert to determine whether the threshold breach event is significant, and requires attention, or whether the threshold breach is only a minor deviation from normal and can safely be ignored.

Figure 3:
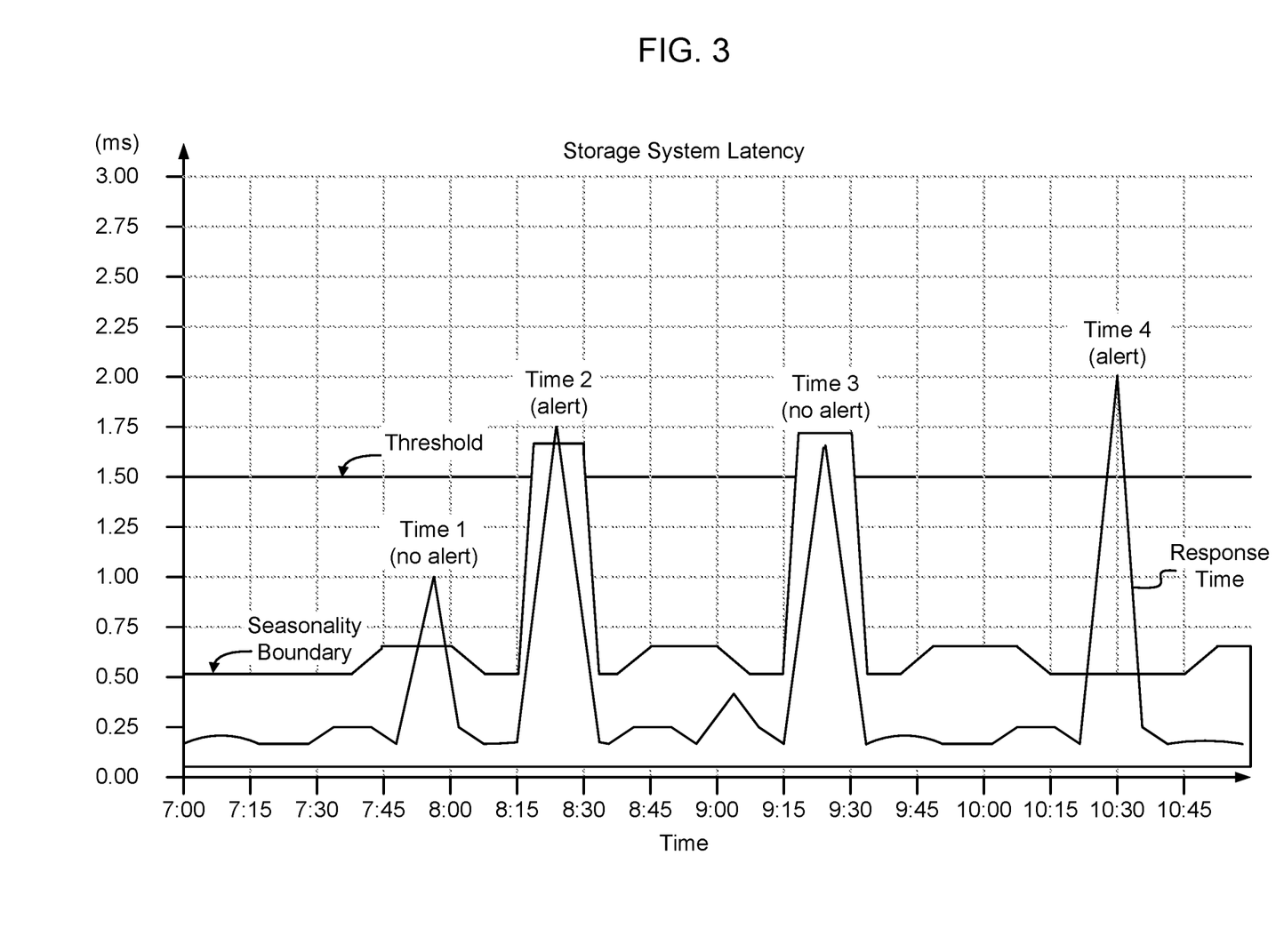
FIG. 3 is a graph showing fluctuation of an example operational metric over time and the storage system management application response, according to some embodiments.

FIG. 3 is a graph showing a hypothetical fluctuation of an example operational metric (storage system latency) over a period of time, and the storage system management application response, according to some embodiments. FIG. 3 shows the upper and lower seasonality boundaries for all time periods to provide an indication of how the seasonality of an example operational metric might vary over time. In some embodiments, the intelligent comparison engine 206 only calculates the seasonality boundary of the operational parameter when a threshold breach occurs. Accordingly, in operation the seasonality boundary would only be calculated at Time 2, Time 3, and Time 4, and would not be calculated during intervals where the operational parameter did not breach the threshold.

In FIG. 3, the latency threshold has been set at 1.5 ms, as shown by the solid horizontal line. In some embodiments, the thresholds for the various metrics are fixed values that do not vary over time. Even if the seasonality boundary is outside of a given threshold, the respective threshold for the respective metric remains fixed.

In FIG. 3 at Time 1, the storage system latency has increased beyond its seasonality boundary but has not exceeded the threshold. Accordingly, no alert is generated at Time 1. As noted above, in some embodiments the seasonality boundaries are not calculated until a threshold is breached and, accordingly, the storage system management application would not detect, at Time 1, that the storage system latency is outside the seasonality boundaries for that time interval.

At Time 2, the storage system latency has increased to exceed the threshold of 1.5 ms. Accordingly, the intelligent comparison engine will obtain historic performance data 202 for storage system latency and determine upper and lower seasonality boundaries. Since the current performance data for storage system latency exceeds the upper seasonality bound, an alert is generated. However, the current latency value is not significantly outside of the upper seasonality bound. By including the seasonality boundaries with the alert, a storage administrator can learn that the latency is outside of the normal seasonality boundaries, but not by much, which enables the storage administrator to make a more informed decision about how to respond to the alert and whether to take action in response to the alert. Optionally, in some embodiments, an alert is not generated until the measured storage system performance is more than a given percentage (i.e. >10%) outside the seasonality boundaries.

At Time 3, the storage system latency has increased to exceed the threshold of 1.5 ms. Accordingly, the intelligent comparison engine will obtain historic performance data 202 for storage system latency and determine upper and lower seasonality boundaries. Since the current performance data for storage system latency is within the seasonality boundaries, no alert is generated at Time 3.

At Time 4, the storage system latency has increased to exceed the threshold of 1.5 ms. Accordingly, the intelligent comparison engine will obtain historic performance data 202 for storage system latency and determine upper and lower seasonality boundaries in that time period. Since the current performance data for storage system latency is outside the seasonality boundaries, an alert is generated. As shown in FIG. 3, at Time 4 the latency is very far outside of the seasonality boundaries. In embodiments where the alert includes the seasonality boundaries, the storage system administrator can determine that the threshold breach truly is an anomaly, and that the increase in latency is not related to seasonal variation of the storage system operational parameters.

Figure 4:
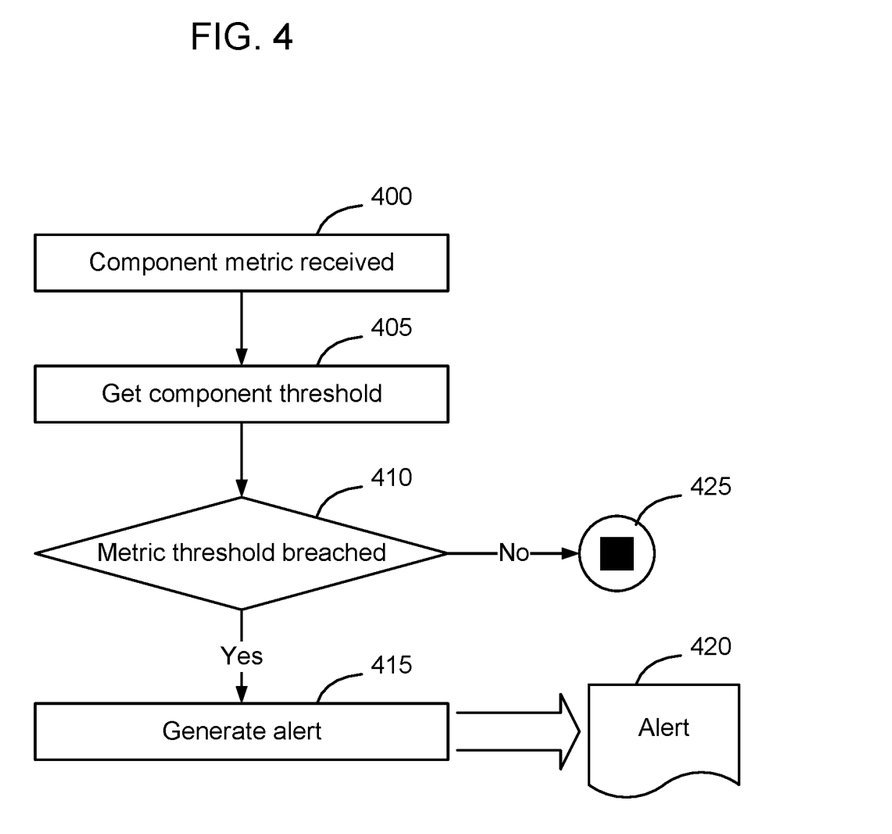
FIG. 4 is a flow chart of a conventional method of generating storage system alerts related to storage system operational metrics.

FIG. 4 is a flow chart of a conventional method of generating storage system alerts related to storage system operational metrics. As shown in FIG. 4, conventionally when information about a component metric was received (block 400), the respective threshold was retrieved (block 405) and a comparison would be performed to compare the received metric with the respective threshold (block 410). If the received metric had not breached the respective threshold (a determination of NO at block 410), the process would end 425. If the received metric had breached the respective threshold (a determination of YES at block 410) the system would generate an alert (block 415) and the alert 420 would be sent to a system administrator. After the alert was sent, the process would end. This process resulted in excessive numbers of alerts, including alerts that indicated that the storage system 100 was operating improperly, when the storage system 100 simply was operating in a seasonably adjusted normal manner.

Figure 5:
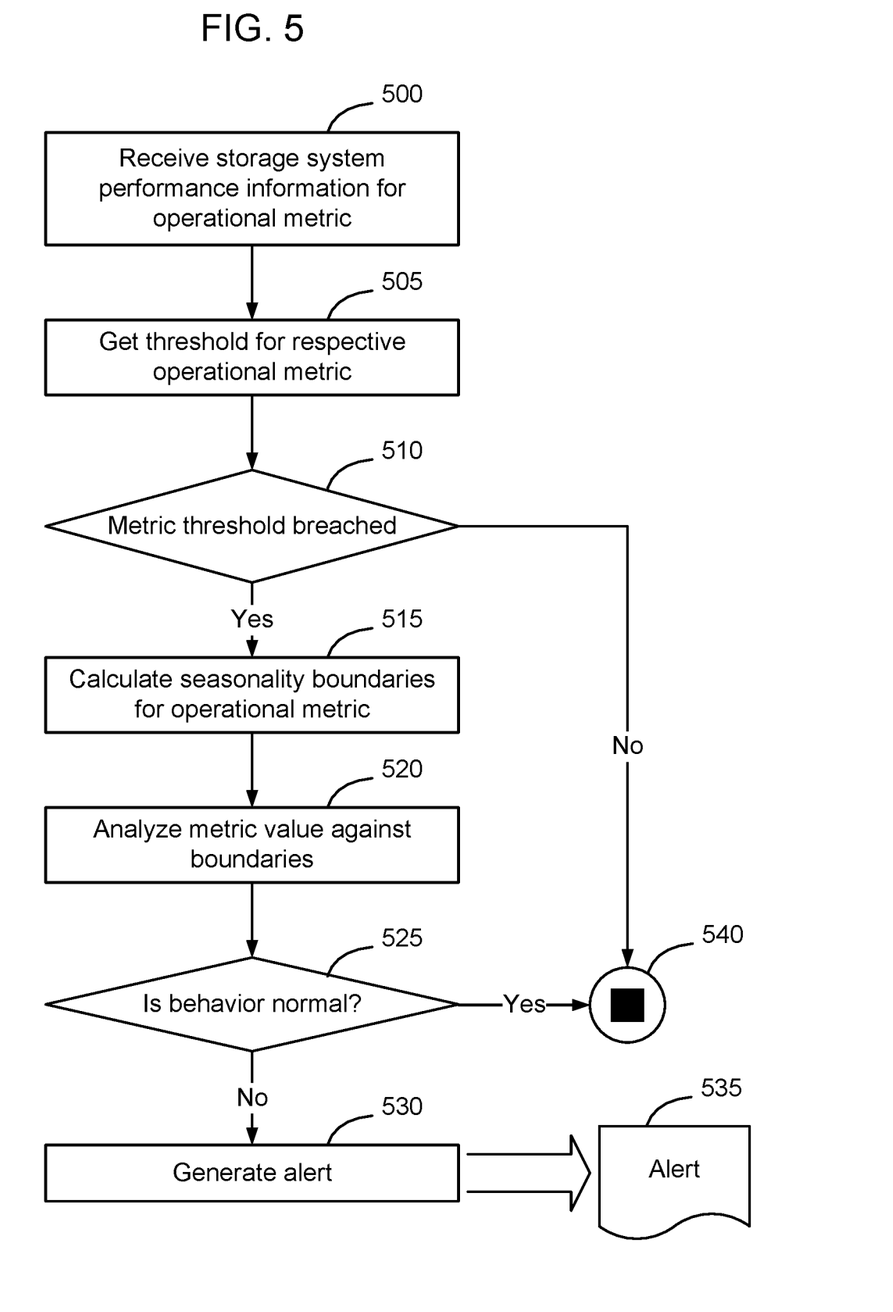
FIG. 5 is a flow chart of a method of generating fewer and more accurate alerts related to storage system operational metrics, according to some embodiments.

FIG. 5 is a flow chart of a method of generating fewer and more accurate alerts related to storage system operational metrics, according to some embodiments. As shown in FIG. 5, the first part of the process is similar to the conventional process. Specifically, when information about a current operational metric value is received (block 500), the threshold for the respective operational metric is retrieved (block 505) and a comparison is performed to compare the current operational metric value with the respective threshold (block 510). If the current operational metric value has not breached the respective threshold (a determination of NO at block 510), the process ends 540 and no alert is sent.

As shown in FIG. 5, if the current operational metric value has breached the respective threshold (a determination of YES at block 510), the intelligent comparison engine 206 obtains historic performance data 202 and calculates seasonality boundaries for the current operational metric at that point in time (block 515). The current operational metric value is then compared against the calculated seasonality boundaries (block 520). A determination is then made, in block 525, as to whether the current operational metric value is normal, given the seasonality boundaries for the metric. If the current operational metric value is within the seasonality boundaries for the respective metric (a determination of YES at block 525), the process ends 540 and no alarm is generated.

If the current operational metric value both has breached the respective threshold (a determination of YES at block 510) and is outside of the calculated seasonality boundaries (a determination of NO at block 525), the alert generation subsystem 208 generates an alert (block 530) and the alert 535 is sent to a system administrator.

Advantageously, in some embodiments, because the storage system management application has calculated the seasonality boundaries for the respective operational metric, the alert 535 may include information about both the current operational metric value and the calculated seasonality boundaries for the operational metric. By including the seasonality boundaries for the operational metric, as well as the current operational metric value, the system administrator is able to determine from the alert not only the value of the metric that caused the alert, but also the magnitude of deviation of the current operational metric value from what is considered normal behavior of the storage system during the monitoring interval.

In some embodiments, the alert generation subsystem 208 includes a severity indicator in the alerts that are generated, indicating how much the storage system operational metric is outside the calculated seasonality boundaries during the time interval when the threshold breach occurred. For example, if the storage system is operating more than 10% outside of its seasonality boundaries, the alert may include a RED severity indicator indicating that the breach is serious. By contrast, if the storage system is operating less than 10% outside of its seasonality boundaries, the alert may include a YELLOW severity indicator to notify that a breach has occurred, but that the threshold breach is not significantly outside of the seasonality boundaries for the respective operational metric. Other thresholds may be used as well, depending on the implementation.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible non-transitory computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of implementing a performance alerting mechanism combining thresholds and historical seasonality, the method comprising:
   receiving, from a host device, an IO command;
   sending, responsive to determining that the IO command cannot be serviced by memory of the host device, the IO command to a storage system; and
   monitoring performance of the storage system;
   wherein monitoring the storage system comprises:
      collecting, during a monitoring time interval, storage system performance data of that is a plurality of operational metrics of a storage system;
      comparing the collected storage system performance data with a plurality of threshold values to determine whether one or more of the plurality of operational metrics has breached its respective threshold value in the plurality of threshold values;
      determining that a first operational metric, of the plurality of operational metrics, has breached its first respective threshold of the plurality of threshold values;
      responsive to determining that the first operational metric has breached the first respective threshold:
         obtaining historic performance data, of the storage system, of the first operational metric, the historic performance data is over a preceding period of time;
         calculating, based on the obtained historic performance data, seasonality boundaries of the first operational metric, in time interval in which the first respective threshold breach occurred; and
         determining that the first operational metric is outside the calculated seasonality boundaries; and
         generating an alert responsive to determining that the first operational metric is outside the calculated seasonality boundaries.

2. The method of claim 1, wherein the alert contains a value of the first operational metric, the first respective threshold, and the calculated seasonality boundaries of the first operational metric.

3. The method of claim 1, wherein at least some of the plurality of thresholds are expressed as bandwidth, response time, or throughput.

4. The method of claim 1, wherein the historic performance data comprises a timeseries data of the first operational metric, and wherein the step of calculating the seasonality boundaries comprises decomposing the timeseries data to determine a seasonal component, a trend component, and a random component of the timeseries.

5. The method of claim 4, wherein the step of decomposing the timeseries is implemented using a Seasonal and Trend Decomposition using Loess.

6. The method of claim 4, wherein the seasonal component reflects periodic variation of the first operational metric.

7. The method of claim 1, wherein the preceding period of time is a two week or longer period of time.

8. A system, comprising:
   a host device and a storage system;
   the host device being configured to receive an IO command, determine whether the IO command can be serviced from memory of the host device, and responsive to determining that the IO command cannot be serviced by memory of the host device, send the IO command to the storage system;
   the storage system being configured to receive the TO command from the host device and respond to the TO command;
   the storage system including a storage system performance monitoring system configured to collect, during a monitoring time interval, storage system performance data that is a plurality of operational metrics of the storage system, and generate reports of storage system operational metrics at end of the monitoring interval; and
   the storage system further including a storage system management application configured to receive the reports of storage system operational metrics, and compare the collected storage system performance data with a plurality of threshold values to determine whether one or more of the plurality of operational metrics has breached its respective threshold value in the plurality of threshold values, the storage system management application further comprising control logic configured to:
      if a first operational metric, of the plurality of operational metrics, has breached its first respective threshold of the plurality of threshold values:
         obtain historic performance data, of the storage systems the first operational metric, the historic performance data is over a preceding period of time;
         calculate, based on the obtained historic performance data, seasonality boundaries of the first operational metric, in time interval in which the first respective threshold breach occurred; and generate an alert only when the first operational metric is outside the calculated seasonality boundaries.

9. The system of claim 8, wherein the alert contains a value of the first operational metric, the first respective threshold, and the calculated seasonality boundaries of the first operational metric.

10. The system of claim 8, wherein at least some of the plurality of thresholds are expressed as bandwidth, response time, or throughput.

11. The system of claim 8, wherein the historic performance data comprises a timeseries data of the first operational metric, and wherein the control logic configured to calculate the seasonality boundaries comprises control logic configured to decompose the timeseries data to determine a seasonal component, a trend component, and a random component of the timeseries.

12. The system of claim 11, wherein the logic configured to decompose the timeseries is configured to perform a Seasonal and Trend Decomposition using Loess.

13. The system of claim 11, wherein the seasonal component reflects periodic variation of the first operational metric.

14. The system of claim 8, wherein the period of time preceding the monitoring interval is a two week or longer period of time.

15. A method of implementing a performance alerting mechanism combining thresholds and historical seasonality, comprising:
   setting a plurality of QOS metrics on a storage system by a storage system management application, the QOS metrics specifying required storage system operation parameters;
   receiving, from a host device, an IO command;
   sending, responsive to determining that the TO command cannot be serviced by memory of the host device, the TO command to the storage system; and
   monitoring performance of the storage system;
   wherein monitoring the storage system comprises:
      collecting, during a monitoring time interval, storage system performance data that is a plurality of operational metrics of the storage system by a storage system performance monitoring system, the plurality of operational metrics including operational characteristics of physical aspects of the storage system and operational metrics of logical aspects of the storage system;
      providing reports describing operation of the storage system by the storage system performance monitoring system to the storage system management application;
      comparing, by the storage system management application, the collected storage system performance data with a plurality of threshold values to determine whether one or more of the plurality of operational metrics has breached its respective threshold value in the plurality of threshold values;
      determining that a first operational metric, of the plurality of operational metrics, has breached its first respective threshold of the plurality of threshold values;
      responsive to determining that the first operational metric has breached the first respective threshold:
         obtaining historic performance data, of the storage system, of the first operational metric, the historic performance data is over a preceding period of time;
         calculating, based on the obtained historic performance data, seasonality boundaries of the first operational metric, in time interval in which the first respective threshold breach occurred; and
         determining that the first operational metric is outside the calculated seasonality boundaries; and
         generating an alert by the storage system management application responsive to determining that the first operational metric is outside the calculated seasonality boundaries.

16. The method of claim 15, wherein the alert contains a value of the first operational metric, the first respective threshold, and the calculated seasonality boundaries of the first operational metric.

17. The method of claim 15, wherein at least some of the plurality of thresholds are expressed as bandwidth, response time, or throughput.

18. The method of claim 15, wherein the historic performance data comprises a timeseries data of the first operational metric, and wherein the control logic configured to calculate the seasonality boundaries comprises control logic configured to decompose the timeseries data to determine a seasonal component, a trend component, and a random component of the timeseries.

19. The method of claim 18:
   wherein the logic configured to decompose the timeseries is configured to perform a Seasonal and Trend Decomposition using Loess; and
   wherein the seasonal component reflects periodic variation of the first operational metric.

20. The method of claim 15, wherein the period of time preceding the monitoring interval is a two week or longer period of time.

* * * * *

UNITED STATES PATENT AND TRADEMARK OFFICE
CERTIFICATE OF CORRECTION

PATENT NO. : 11,366,606 B2  
APPLICATION NO. : 17/060190  
DATED : June 21, 2022  
INVENTOR(S) : Lisa O'Mahony et al.

Page 1 of 1

It is certified that error appears in the above-identified patent and that said Letters Patent is hereby corrected as shown below:

In the Claims

Column 12, Line 38, change "TO" to --IO--.  
Column 12, Line 39, change "TO" to --IO--.  
Column 12, Line 61, change "systems" to --system, of--.  
Column 13, Line 34, change "TO" to --IO--.  
Column 13, Line 36, change "TO" to --IO--.

Signed and Sealed this  
Twenty-sixth Day of July, 2022

Katherine Kelly Vidal  
*Director of the United States Patent and Trademark Office*